United States Patent [19]

Rhodes

[11] Patent Number: 5,012,846

[45] Date of Patent: May 7, 1991

[54] CUTTING TOOL GUARD FOR A CUTTING MACHINE

[76] Inventor: William T. Rhodes, 3347 Camp Ground Rd., P.O. Box 16348, Louisville, Ky. 40216

[21] Appl. No.: 564,596

[22] Filed: Aug. 9, 1990

[51] Int. Cl.⁵ .............................. B27C 1/18; B27C 5/02
[52] U.S. Cl. ............................ 144/145 A; 144/251 A; 408/DIG. 710; 409/134
[58] Field of Search ............ 144/145 R, 145 A, 251 R, 144/251 A, 253 J; 408/DIG. 710; 409/134

[56] References Cited

U.S. PATENT DOCUMENTS

| 21,397 | 8/1858 | Storer | 144/145 A |
| 3,859,950 | 1/1975 | York | 144/251 A |
| 4,241,771 | 12/1980 | Rhodes et al. | 144/145 A |
| 4,552,494 | 11/1985 | Wix | 144/251 A |

*Primary Examiner*—W. Donald Bray
*Attorney, Agent, or Firm*—Charles G. Lamb

[57] ABSTRACT

In combination with an automatic shaping device having a feed device for feeding material to a cutting tool, a cutting tool guard movable between a lowered position beneath the cutting tool and a raised position surrounding the cutting tool.

3 Claims, 3 Drawing Sheets

CUTTING TOOL GUARD FOR A CUTTING MACHINE

BACKGROUND OF THE INVENTION (1) Field of the Invention

This invention relates to feed means for automatic shaping equipment and particularly relates to an automatically actuated guard for the cutting tool of the shaping equipment.

(2) Discussion of the Prior Art

In the production of duplicate workpieces having irregular shapes, such as, for example, pieces that go into making wood furniture, many different types of feeding devices are used for feeding workpieces to cutting or shaping tools. Most of the feeding devices include means to mount templates or patterns thereon with means to follow the patterns and feed the workpieces to cutting or shaping machines in conformity with a predetermined pattern. The cutting tools are typically unguarded.

SUMMARY OF THE INVENTION

The present invention advantageously provides a guard means for an automatic shaping device. The present invention further provides guard means which automatically moves away from the cutting tool as workpieces are fed to the cutting tool and toward the cutting tool as the workpieces move away from the cutting tool.

Various other features of the present invention will occur to those skilled in the art upon reading the disclosure set forth hereinafter.

More particularly, the present invention provides an automatic shaping device which includes a frame, a table mounted onto the frame, a movable template mounted onto the table, a rotatable cutting tool mounted above the table, and means to feed workpieces toward and away from the rotatable cutting tool, the improvement comprising cutting tool guard means movable away from the rotatable cutting tool as the workpiece feed means moves toward the rotatable cutting tool and toward the rotatable cutting tool as the workpiece feed means moves away from the rotatable cutting tool.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 1:
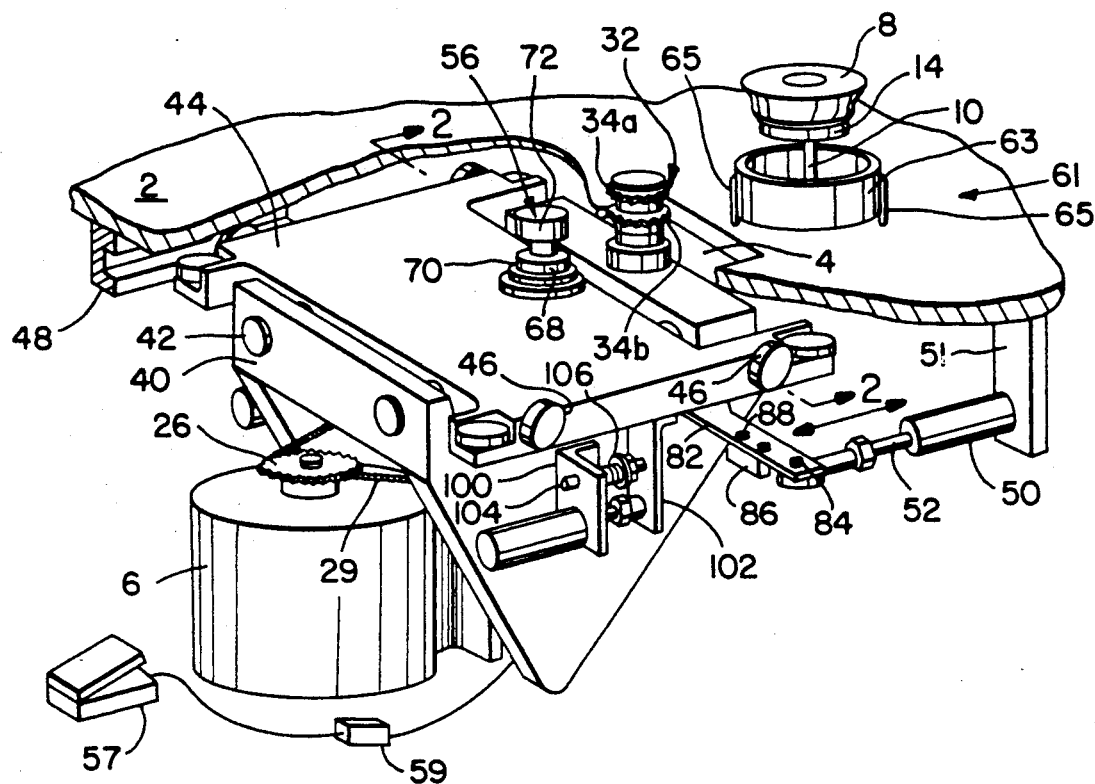
FIG. 1 is a perspective view, partially cut-away, of a feed device of the present invention, including the cutter tool guard of the present invention.
Figure 2:
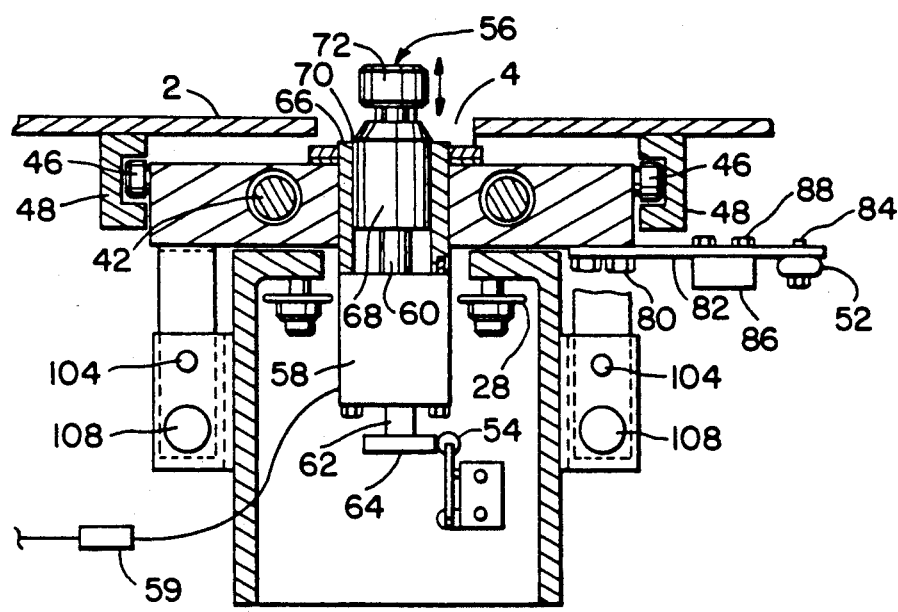
FIG. 2 is a cross-sectional view taken in a plane passing through line 2—2 of FIG. 1.
Figure 3:
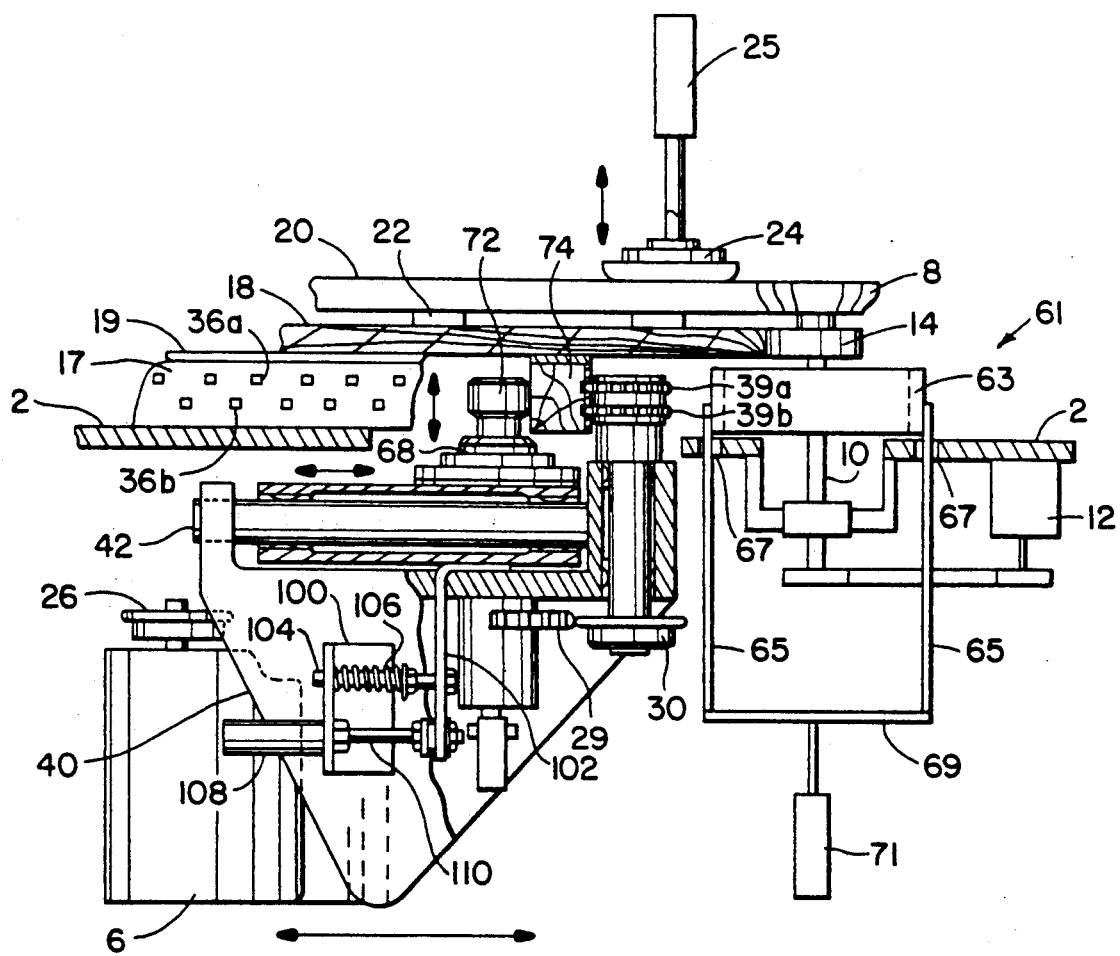
FIG. 3 is a side view of the automatic shaping device of FIG. 1 with selected portions cut-away to show details, and with the cutting tool guard of the present invention in the lowered position relative to a cutting tool of the shaping device.

FIGS. 1 and 2 show a shaping device which includes a large horizontal table top 2 with a smooth surface upon which objects can slide around with complete freedom of movement by rotation or translation or both. And, as best shown in FIG. 3, a track 17 is mounted onto the table 2 for movement thereon upon engagement with drive means, to be discussed hereinafter. Mounted onto the track 17 is a pallet 19 which supports a template 18 and a workpiece 20. For a better understanding of one workpiece feed assembly for use with a cam follower assembly of the present invention, reference is made to U.S. Pat. No. 3,447,420.

With reference to FIGS. 1-4, conventional rotary cutting tool 8 is mounted for rotation on a vertical axis on a drive shaft 10 which is energized by a conventional motor 12. Beneath the cutting tool 8 is a stationary abutment 14 of cylindrical form, co-axial with shaft 10. A workpiece 20 is carried by the template 18 and rotated thereby for engagement with cutting tool 8. Shims 22 of preselected thickness are provided for spacing the workpiece 20 from the template 18 for proper alignment of the workpiece 20 with the cutting tool 8. A hold down means, shown as a vertically movable shoe 24, is provided to hold the workpiece 20 tight against the template 18 to prevent slippage of the workpiece 20 upon engagement with the cutting tool 8. Toward this objective, the shoe 24 is affixed to the end of the operating rod of a fluid cylinder device 25 vertically oriented above the template 18 such that when the operating rod of the cylinder device 25 is retracted, the shoe is in the raised position spaced above the workpiece 20 (see FIG. 4), and when the operating rod of the cylinder device 25 is extended, the shoe 24 is in the lowered position tightly against the workpiece 20 (see FIG. 3). It is realized that other hold down means, such as clamps, and the like, may also be used.

In FIG. 1, table top 2 is provided with an opening 4 therethrough to receive the drive means for the feed device of the present invention. The drive means includes a drive motor 6 to which a driving sprocket 26 is mounted and driven thereby. The drive means further includes a pair of idlers 28 and a sprocket wheel 30 with an appropriate chain 29 to which a vertically extending rotatable mounted drive shaft 32 is attached. Mounted to the upper extremity of drive shaft 32 is a twin unit pinion having an upper set of teeth 34a and a lower set of teeth 34b for engaging with cooperating apertures in track 17, track 17 having two rows of apertures identifiable by numerals 36a and 36b. The two sets of teeth 34a and 34b are rigid with respect to each other and co-axial therewith. Preferably, the teeth of 34a and 34b are offset in respect to each other by half the pitch of the gear teeth so that the upper row of apertures 36a receive the teeth 34a and the lower row of apertures 36b receive the teeth 34b. This offset arrangement enables teeth 34a to be in transition from one rack tooth to the next and simultaneously therewith teeth 34a are positioned at angles whereby they do not carry the load effectively. This enables smooth and effective driving of the track 17.

The feed device includes a stationarily mounted frame member 40 with a pair of aligned apertures on opposed sides thereof to receive a pair of rod members 42 therethrough. Rod members 42 slidably support a movable flat plate member 44 thereon. Flat plate member 44 on opposed sides thereof is provided with a pair of aligned apertures through which the rod members 42 are received. Movable flat plate member 44 is provided with a pair of rollers 46 on each end thereof movable within elongated brackets 48 of L-shaped cross-section. Brackets 48 are fixedly attached, generally by welding to the underside of table 2.

The driving force for moving the feed device in a horizontal direction is an air cylinder 50 fixedly attached to the table 2 with a bracket 51 with a movable piston 52 therein movable in response to actuation of a pneumatic switch 54 (FIG. 2). Pneumatic switch 54 is actuated by the movement of cam follower assembly 56 thereby. As best seen in FIG. 2, the cam follower assembly 56 includes an air cylinder 58 disposed in an upward direction with a movable piston 60 extending therethrough. The movable piston 60 on the lower end therein includes a shaft 62 movable therewith with a flange 64 on the lower extremity thereof. Flange 64 is disposed for engagement with switch 54 as the piston 60 moves thereby. Actuation of piston 60 is in response to any known means in the art, such as a manually operated switch means with an appropriate actuating device, such as a foot pedal 57 (FIG. 1) with appropriate electrical connection therewith. Since actuating means are well known in the art, they are not discussed further herein.

The cam follower assembly 56 includes a guide sleeve 66 fixedly attached to the upper end of air cylinder 58 to receive movable collar 68 therein. Sleeve 66 is provided with a key-way to receive a key 70 therein. Key 70 is attached to the collar 68. On the upper extremity of the piston 60 is a cam follower 72, cam follower 72 being movable upon movement of piston 60 and disposed for engagement with the inner surface 74 (FIG. 3) of track 17.

Bolted to the underside of flat plate member 44 by bolts 80 is a horizontally extending flat plate support 82 to which one end of the piston 52 is attached, piston 52 being bolted to support 82 by bolt member 84. Also attached to the support 82 is a stop member 86 which is a vertically attached flat plate member, stop member 86 being attached to the support 82 by bolt members 88 (FIG. 1).

The feed device is also provided with biasing means to hold the cam follower 72 against the inner surface 74 of the track 17 and yet allow for varying thickness of track 17 without interfering with the operation of the device of the present invention. As best shown in FIG. 3, the biasing means includes an outwardly extending L-shaped bracket 100 fixedly attached, generally by welding, to frame member 40. Another L-shaped bracket 102 which is downwardly extending and fixedly attached to movable plate member 44, generally by welding, is also provided. Bracket 100 includes an aperture therein to receive a bolt 104 therethrough. Bolt 104 extends through the bracket 100 and is fixedly attached to bracket 102 with a spiral spring 106 therearound disposed between brackets 100 and 102. An air cylinder 108 with piston 110 operable thereby is also attached to brackets 100 and 102 to maintain a positive pressure on plate member 44 through the bracket 102. Thus, upon changes in the thickness or other variables of the track 17, cooperation of the biasing means and the air cylinder means allows for movement of the cam follower assembly to compensate for the malfunction without harming the equipment.

In the operation of the feed device, a template 18 and a workpiece 20 are mounted onto a pallet 19, as discussed hereinbefore, with the shoe 24 is moved downwardly toward the template 18 and against the workpiece 20 to hold the workpiece 20 in a fixed position upon the pallet 19 (see FIG. 3). Foot pedal 57 is then depressed to actuate pneumatic valve 59 and air cylinder 58 which moves cam follower assembly 56 upwardly from its lowered position. As cam follower assembly 56 moves upwardly, flange 64 of piston 60 moves past pneumatic switch 54 which actuates air cylinder 50. Air cylinder 50 having a piston 52 attached through appropriate linkage to plate member 44 pulls the plate member 44 with cam follower assembly 56 attached thereto into engagement with the inner surface 74 of track 17. Drive motor 6 for the feed device is then energized and through cooperating drive elements discussed hereinbefore drives the twin unit pinion 34a and 34b thereby turning the workpiece 20 in conformity to the template 18.

As shown best in FIGS. 2 and 3, the motor 12 is operatively connected to the drive shaft 10 by means of a sheave on the drive shaft 10, a sheave on the output shaft of the motor 12, and a belt trained about the sheaves.

Figure 4:
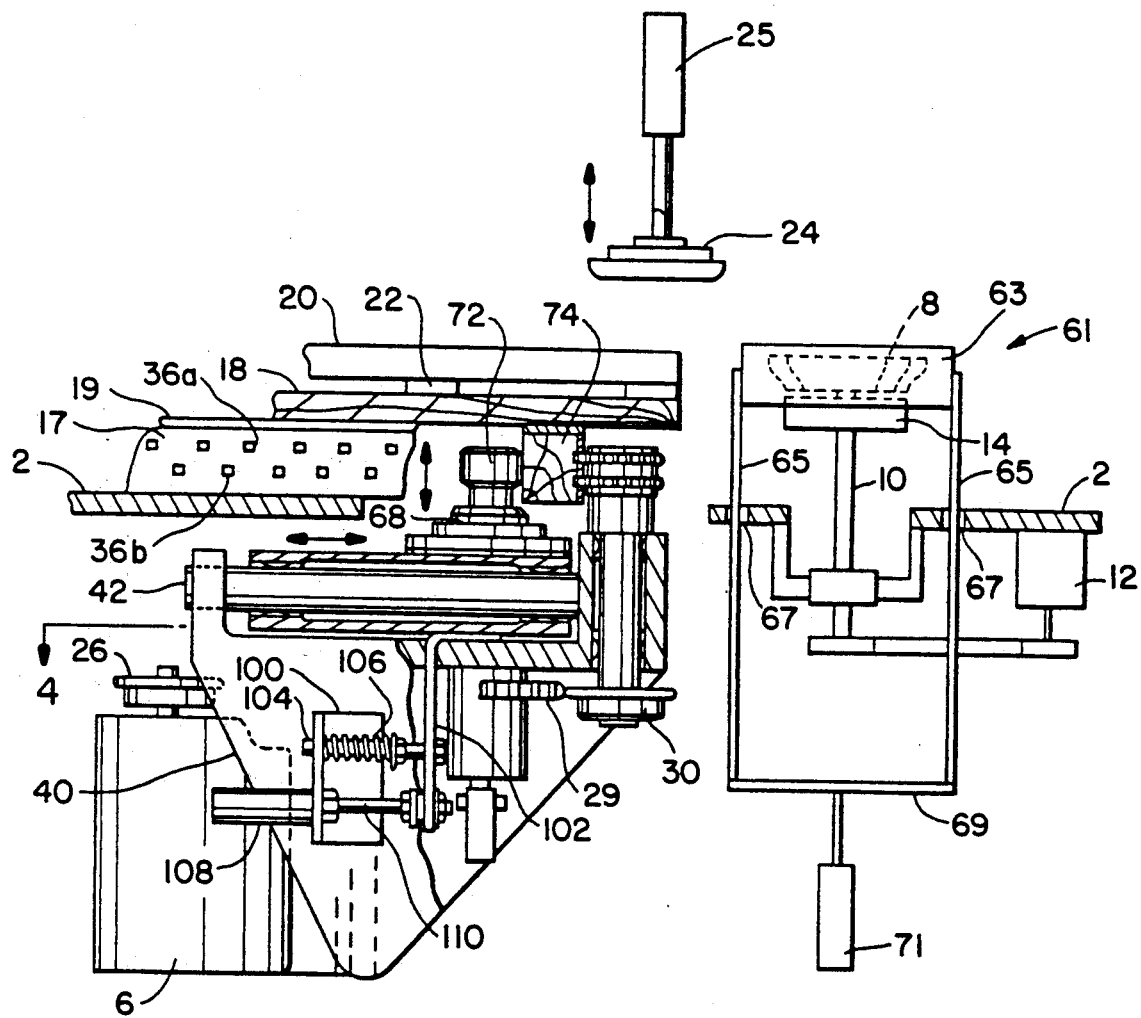
FIG. 4 is a side view of the cutting tool guard of the present invention in the raised position relative to a cutting tool of the shaping device.

Cutter guard means, generally denoted as the numeral 61, is located on the table 2 proximate the cutting tool 8. As shown, the cutter guard means 61 includes a cylindrical guard 63 coaxial with the shaft 10 and rotary cutter tool 8, and is movable up and down along the axis of the drive shaft 10 upward toward and downward away from the cutter tool 8. When in the upward position, as shown in FIG. 4, the cylindrical guard 63 is located in coaxial surrounding relationship to the cutting tool 8, and when in the downward position, as shown in FIG. 3, the cylindrical guard 63 is located beneath the rotary cutting tool 8 just above the table 2. Toward this objective, the cylindrical guard 63 is mounted to the top ends of a pair of vertical support rods 65 which are parallel to the drive shaft 10 and spaced to either side of the drive shaft 10. The support rods 65 are journaled in bearings 67 in the table 2 for movement in their longitudinal direction and a horizontal cross member 69 is connected to the bottom ends of the support rods 65. An air cylinder device 71 is vertically mounted below the horizontal cross member 69 with its operating rod connected to the cross member 69. Therefore, as the air cylinder device 71 is operated to extend its operating rod, the operating rod pushes the support rods 65 upwardly moving the cylindrical guard 63 from the lowered position (FIG. 3) to the raised position (FIG. 4) surrounding the cutter tool 8. As the air cylinder device 71 is operated to retract its operating rod, the operating rod pulls the support rods 65 downwardly moving the cylindrical guard 63 from the raised position to the lowered position exposing the cutter tool 8. The air cylinder device 71 is operatively associated with a source of pressurized air (not shown) with intermediate valving as is well-known so that the air cylinder device 71 will operate sequentially with the air cylinder 50 of the feed device. The air cylinder device 25 is also operatively associated with the source of pressurized air (not shown) with intermediate valving, as is well-known, so that the air cylinder device 25 will operate sequentially with the air cylinder 50 of the feed device. In operation, when the cylinder 50 is operated to move the flat plate member 44 such that as the table 2 moves the workpiece 20 toward the cutter tool 8, the air cylinder device 25 is first actuated to lower the shoe 24 down against the workpiece 20 to clamp the workpiece 20 against the template 18, and the air cylinder device 71 is actuated to pull the cylindrical guard 63 downwardly away from the cutter tool 8 so that the cutter tool 8 will contact the workpiece 20, and when the table 2 moves the workpiece 20 away from the cutter tool 8, the air cylinder 71 is actuated to push the cylindrical guard 63 upwardly in surrounding relationship to the cutter tool 8, and the air cylinder device 26 is actuated to raise the shoe 24 upwardly away from the workpiece 20 to release the workpiece 20.

It will be realized that various changes may be made to the specific embodiment shown and described without departing from the principles of the present invention.

What is claimed is:

1. In an automatic shaping device that includes a frame, a table mounted onto said frame, a movable template mounted onto said table, means to move said template in driving relationship with said template, shaping cutter means mounted above said table, a power-drive workpiece carrying member mounted to said table, and means to feed a workpiece to said shaping cutter means, the improvement comprising:

cutter means guard means movable between a lowered position below said cutter means and a raised position surrounding said cutter means.

2. The automatic shaping device of claim 1, further comprising means operatively associated with said workpiece feed means for lowering said guard means to the lowered position when said workpiece feed means feeds a workpiece to said cutter means, and for raising said guard means to the raised position when said workpiece feed means moves the workpiece away from said cutter means.

3. The automatic shaping device of claim 2, wherein said cutter means comprises a rotating cutting tool, and said guard means comprises a cylindrical guard coaxial with the rotating cutting tool.

* * * * *